(12) United States Patent
Chung et al.

(10) Patent No.: US 9,110,691 B2
(45) Date of Patent: Aug. 18, 2015

(54) COMPILER SUPPORT TECHNIQUE FOR HARDWARE TRANSACTIONAL MEMORY SYSTEMS

(75) Inventors: Jaewoong Chung, Bellevue, WA (US); Rahmet U. Karpuzcu, Urbana (IL); David S. Christie, Austin, TX (US); Michael P. Hohmuth, Dresden (DE); Stephan Diestelhorst, Dresden (DE); Martin T. Pohlack, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1119 days.

(21) Appl. No.: 12/947,336

(22) Filed: Nov. 16, 2010

(65) Prior Publication Data

US 2012/0124563 A1   May 17, 2012

(51) Int. Cl.
*G06F 9/45*   (2006.01)
*G06F 9/46*   (2006.01)

(52) U.S. Cl.
CPC ............. *G06F 8/447* (2013.01); *G06F 9/467* (2013.01)

(58) Field of Classification Search
None
See application file for complete search history.

(56) References Cited

U.S. PATENT DOCUMENTS

| | | | |
|---|---|---|---|
| 7,395,382 B1 * | 7/2008 | Moir | 711/147 |
| 7,809,903 B2 * | 10/2010 | Adl-tabatabai et al. | 711/159 |
| 2005/0086446 A1 * | 4/2005 | McKenney et al. | 711/163 |
| 2006/0085591 A1 * | 4/2006 | Kumar et al. | 711/113 |
| 2007/0130238 A1 * | 6/2007 | Harris et al. | 707/206 |
| 2007/0143287 A1 * | 6/2007 | Adl-tabatabai et al. | 707/8 |
| 2007/0156780 A1 * | 7/2007 | Saha et al. | 707/202 |
| 2007/0186069 A1 * | 8/2007 | Moir | 711/162 |
| 2007/0288902 A1 * | 12/2007 | Lev et al. | 717/124 |
| 2008/0120590 A1 * | 5/2008 | Wang et al. | 717/100 |
| 2009/0172306 A1 * | 7/2009 | Nussbaum et al. | 711/154 |
| 2010/0017183 A1 * | 1/2010 | Kenney | 703/13 |
| 2010/0023707 A1 * | 1/2010 | Hohmuth et al. | 711/152 |
| 2011/0119452 A1 * | 5/2011 | Heller, Jr. | 711/147 |

OTHER PUBLICATIONS

Advanced Micro Devices, Inc. "Advanced Synchronization Facility—Proposed Architectural Specification" v 2.1 Mar. 2009.*
Wu, Peng et. al. "Compiler and Runtime Techniques for Software Transactional Memory Optimization." Concurrency and Computation: Practice & Experience 21 , No. 1 (2008): 7-23.*
Diestelhorst et al., "Hardware acceleration for lock-free data structures and software-transactional memory," 2008 *Advanced Micro Devices, Inc.* (Aug. 14, 2008).

* cited by examiner

*Primary Examiner* — Jason Mitchell (57) ABSTRACT

A method and apparatus for compiling software written to be executed on a microprocessor that supports at least one hardware transactional memory function is provided. A compiler that supports at least one software transactional memory function is adapted to include a runtime system that maps between the at least one software transactional memory function and the at least one hardware transactional memory instruction.

23 Claims, 4 Drawing Sheets

COMPILER SUPPORT TECHNIQUE FOR HARDWARE TRANSACTIONAL MEMORY SYSTEMS

CROSS-REFERENCE TO RELATED APPLICATIONS

Not applicable.

BACKGROUND

The disclosed subject matter relates generally to hardware transactional memory systems and, more particularly, to compiler support for a hardware transactional memory system.

Transactional memory is generally an attempt to simplify parallel programming by allowing a group of load and store instructions to execute in an atomic way. There are two types of transactional memory: hardware (HTM) and software (STM).

An STM system provides transactional memory semantics in a software runtime library or the programming language. Unlike locking techniques used in most modern multi-threaded applications, STM is very optimistic: a thread completes modifications to shared memory without regard for what other threads might be doing, recording every read and write that it is performing in a log. Instead of placing the onus on the writer to make sure it does not adversely affect other operations in progress, it is placed on the reader, who after completing an entire transaction verifies that other threads have not concurrently made changes to memory that it accessed in the past. This final operation, in which the changes of a transaction are validated and, if validation is successful, made permanent, is called a commit. A transaction may also abort at any time, causing all of its prior changes to be rolled back or undone. If a transaction cannot be committed due to conflicting changes, it is typically aborted and re-executed from the beginning until it succeeds.

An HTM system typically starts a transaction by taking a register checkpoint. Whenever the transaction writes to memory, the transactional data produced by the write operation is maintained separately from the old data by either buffering the transactional data or logging the old value (i.e., data versioning). The HTM system records the memory addresses that are read by the transaction in a read-set. Likewise, the HTM system also records the memory addresses that are written to in a write-set. The HTM system detects a conflict between two transactions by comparing the read-sets and the write-sets of both transactions (i.e., conflict detection). A conflict occurs when two different transactions access the same address and at least one of the transactions intends to write to the address. If a conflict is detected, one of the transactions is rolled back by undoing transactional write operations, restoring the register checkpoint, and discarding transactional metadata (e.g., the read-/write-sets). Absent a conflict, each transaction ends by committing transactional data and discarding transactional metadata and the register checkpoint.

Both systems enjoy certain advantages. For example, STM systems can be implemented with minimal alterations to the hardware on which it will be operated. HTM systems, on the other hand, may require modifications in processors, cache or bus protocol to support new "atomic" transactions. That is, HTM systems require modification to the hardware, whereas STM systems can be implemented on existing hardware. As a consequence, HTM systems with their specialized hardware may experience improved performance of STM systems, but the relative ease of implementing STM systems has allowed STM systems to be developed and implemented more rapidly. Further, because of the more rapid development of STM systems, supporting software, such as compilers necessary to transform source code into executable code have been investigated and developed specifically for use on STM systems. HTM systems have lagged behind, such that compilers are not currently commercially available.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in an apparatus adapted to compile software written to be executed on a microprocessor that supports at least one hardware transactional memory function. The apparatus comprises a compiler having support for at least one software transactional memory function, and a system mapping between the at least one software transactional memory function and the at least one hardware transactional memory instruction.

Another aspect of the disclosed subject matter is seen in a method for providing compiler support for at least one hardware transactional memory instruction. The method comprises: providing a compiler having support for at least one software transactional memory function; and providing a system that maps between the at least one software transactional memory function of the compiler and the at least one hardware transactional memory instruction

BRIEF DESCRIPTION OF THE SEVERAL VIEWS OF THE DRAWINGS

The disclosed subject matter will hereafter be described with reference to the accompanying drawings, wherein like reference numerals denote like elements, and.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
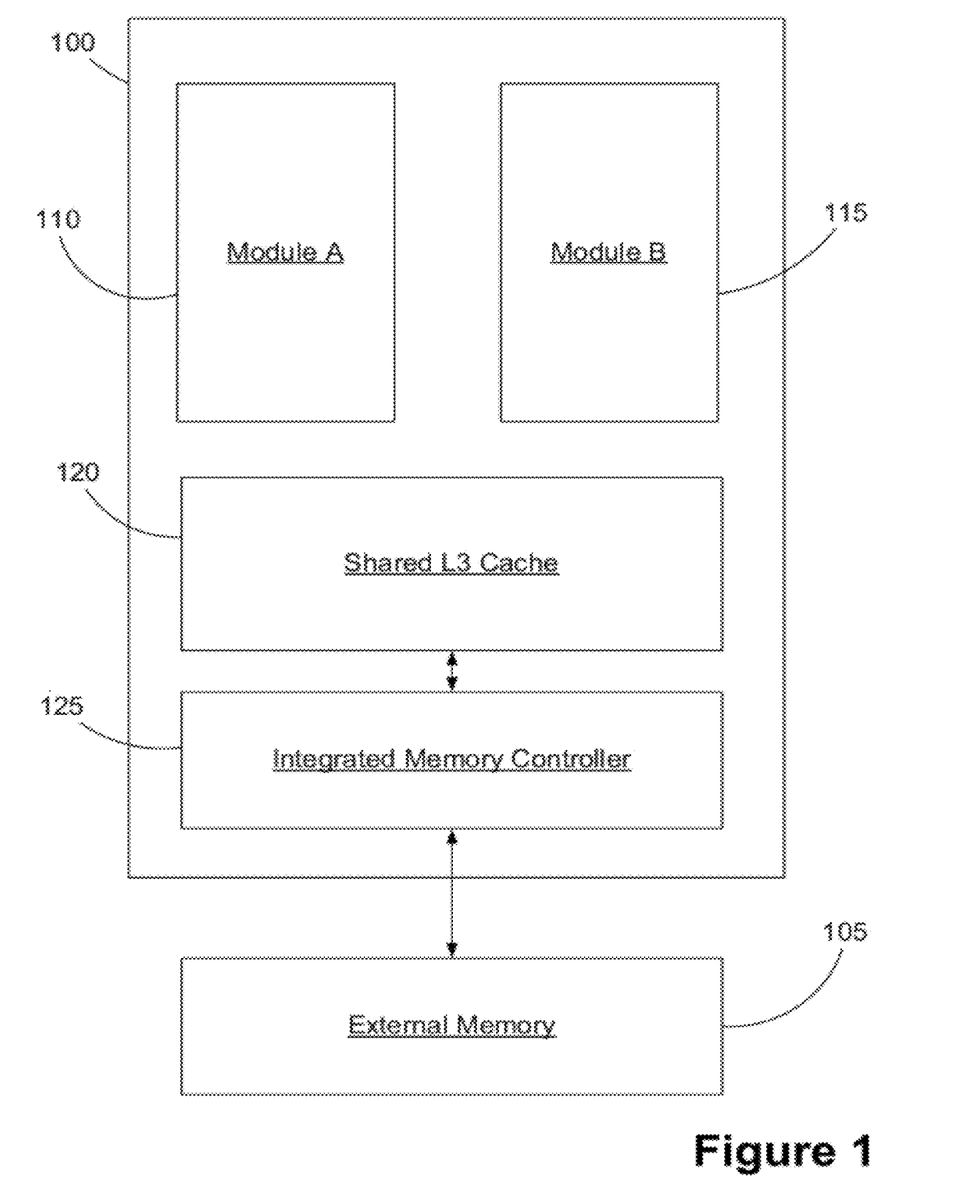
FIG. 1 is a block level diagram of a microprocessor interfaced with external memory.

Referring now to the drawings wherein like reference numbers correspond to similar components throughout the several views and, specifically, referring to FIG. 1, the disclosed subject matter shall be described in the context of an HTM microprocessor 100 coupled with an external memory 105. Those skilled in the art will recognize that a computer system may be constructed from these and other components. However, to avoid obfuscating the instant invention only those components useful to an understanding of the present invention are included.

In one embodiment, the HTM microprocessor 100 employs a pair of substantially similar modules, module A 110 and module B 115. The modules 110, 115 are substantially similar and include processing capability (as discussed below in more detail in conjunction with FIG. 2). The modules 110, 115 engage in processing under the control of software, and thus access memory, such as external memory 105 and/or caches, such as a shared L3 cache 120 and/or internal caches (discussed in more detail below in conjunction with FIG. 2). An integrated memory controller 125 is included within each of the modules 110, 115. The integrated memory controller 125 generally operates to interface the modules 110, 115 with the conventional external semiconductor memory 105. Those skilled in the art will appreciate that each of the modules 110, 115 may include additional circuitry for performing other useful tasks.

Figure 2:
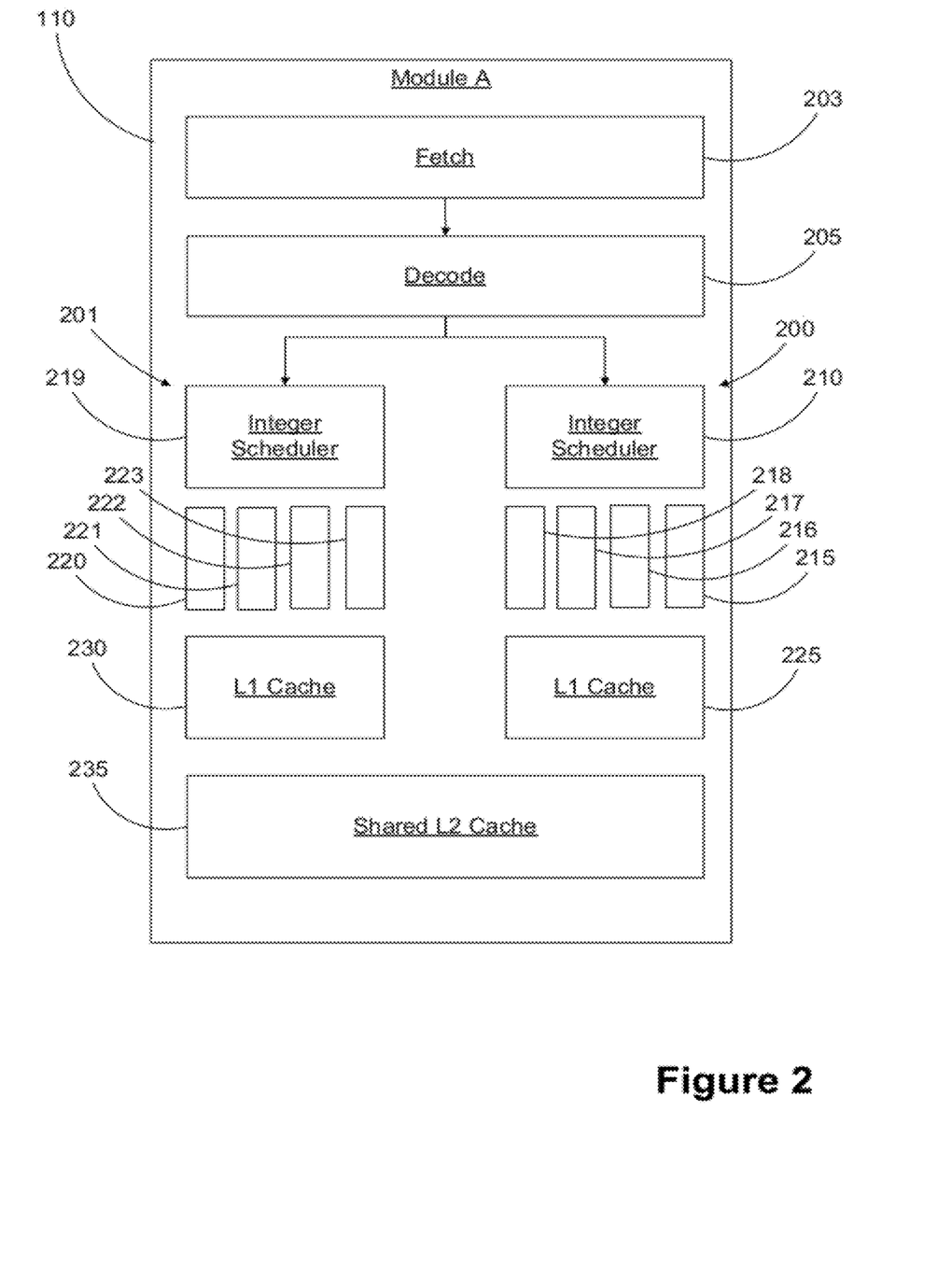
FIG. 2 is a simplified block diagram of a dual-core module that is part of the microprocessor of FIG. 1.

Turning now to FIG. 2, a block diagram representing one exemplary embodiment of the internal circuitry of either of the modules 110, 115 is shown. Generally, the module comprises two processor cores 200, 201 that include both individual components and shared components. For example, the module 110 includes shared fetch and decode circuitry 203, 205, as well as a shared L2 cache 235. Both of the cores 200, 201 have access to and utilize these shared components.

The processor core 200 also includes components that are exclusive to it. For example, the processor core 200 includes an integer scheduler 210, four substantially similar, parallel pipelines 215, 216, 217, 218, and an L1 Cache 225. Likewise, the processor core 201 includes an integer scheduler 219, four substantially similar, parallel pipelines 220, 221, 222, 223, and an L1 Cache 230.

The operation of the module 110 involves the fetch circuitry 203 retrieving instructions from memory, and the decode circuitry 205 operating to decode the instructions so that they may be executed on one of the available pipelines 215-218, 220-223. Generally, the integer schedulers 210, 219 operate to assign the decoded instructions to the various pipelines 215-218, 220-223 where they are executed. During the execution of the instructions, the pipelines 215-218, 220-223 may access the corresponding L1 Caches 225, 230, the shared L2 Cache 235, the shared L3 cache 120 and/or the external memory 105.

The HTM microprocessor 100 is capable of decoding and executing a plurality of conventional instructions that have been implemented on prior microprocessors, such as those previously developed by AMD. The HTM microprocessor 100 is also configured to decode and execute a plurality of additional instructions that are specifically designed to support the HTM aspect of the microprocessor 100. In one embodiment of the instant invention, the HTM microprocessor is capable of decoding and executing a group of five HTM instructions, as shown in Table 1.

TABLE 1

| Category | Instruction | Function |
|---|---|---|
| Transaction Boundary | SPECULATE | Start a transaction |
|  | COMMIT | End a transaction |
| Transactional Memory Access | LOCK MOV [Reg], [Addr] | Load from [Addr] to [Reg] transactionally |
|  | LOCK MOV [Addr], [Reg] | Store from [Reg] to [Addr] transactionally |
| ASF Context Control | ABORT | Abort the current transaction |

In one exemplary embodiment, the HTM microprocessor can implement Advanced Synchronization Facility (ASF), which is described by AMD in "Proposed Architectural Specification Rev. 2.1," which is herein incorporated by reference in its entirety. AMD ASF is an instruction set extension of the type set forth in TABLE I for the AMD64 architecture that provides new capabilities for efficient synchronization of access to shared data in highly multithreaded applications as well as operating system kernels. ASF provides a means for software to inspect and update multiple shared memory locations atomically without having to rely on locks for mutual exclusion.

SPECULATE is for beginning a transaction, and COMMIT is for finishing the transaction. ABORT is for rolling back a transaction voluntarily. LOCK MOV is for indicating which memory accesses need to be processed transactionally (i.e., with data versioning and conflict detection). The memory addresses accessed by LOCK MOV are monitored to see if there is a conflicting transaction accessing the same address. The memory modifications done by LOCK MOV are undone when a transaction is rolled back.

The HTM microprocessor 100 allows user-level and system-level code to modify a set of memory objects atomically without requiring expensive traditional synchronization mechanisms. The HTM microprocessor 100 and the HTM instructions therein provide a way to create inexpensive primitives from which higher-level synchronization mechanisms can be synthesized: for example, multi-word compare-and-exchange, load-locked-store-conditional, lock-free data structures, lock-based data structures that do not suffer from priority inversion, and primitives for software-transactional memory. The HTM microprocessor 100 is both more flexible and less expensive than existing atomic memory modification primitives. Instead of offering new instructions with hard-wired semantics (such as compare-and-exchange for two independent memory locations), the HTM microprocessor only exposes a mechanism for atomically updating multiple independent memory locations and allows software to implement the intended synchronization semantics.

The HTM microprocessor 100 allows software to declare critical sections that specify and modify a set of protected memory locations. Modifications made to protected memory becomes visible to other processors (such as the cores 200, 201) either all at once (when the critical section finishes successfully) or never (if the critical section is aborted).

Unlike traditional critical sections, critical sections in the HTM microprocessor 100 do not require mutual exclusion. Multiple critical sections that may access the same memory locations can be active at the same time on different processors (such as the cores 200, 201), allowing greater parallelism. When the HTM microprocessor 100 detects conflicting accesses to protected memory, it aborts the critical section and notifies the software, which can retry the operation as desired.

Figure 3:
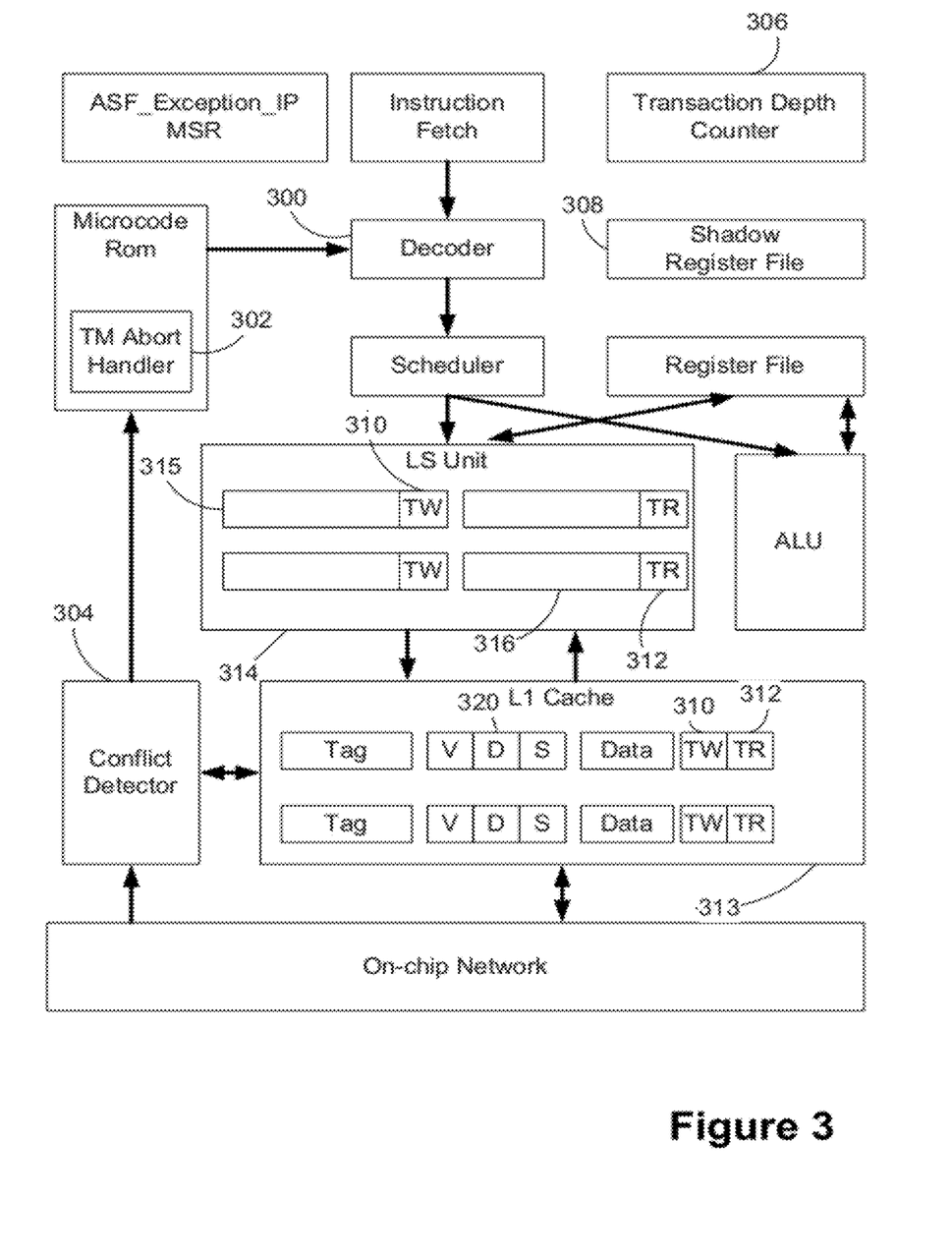
FIG. 3 is a block diagram of one embodiment of an hardware transactional microprocessor.

FIG. 3 shows a block diagram of one embodiment of a hardware structure that may be employed in the HTM microprocessor 100 according to one aspect of the instant invention. The components changed or added from prior microprocessor design include a decoder 300, a TM abort handler 302, a conflict detector 304, a transaction depth counter 306, a shadow register file 308, and two extra bits 310, 312 for each entry in the L1 cache 313 and for each entry in the load store (LS) unit 314. The added two bits include: a TW (transactional write) bit 310 for transactional stores and a TR (transactional read) bit 312 for transactional loads. Within the LS unit 314, the TW bit 310 is added per store queue entry 315, and the TR bit 312 is added per load queue entry 316. The shadow register file 308 is used to checkpoint rIP and rSP. The decoder 300 has been changed to recognize the five new instructions identified in Table 1. The transaction depth counter 306 is used to count the transaction nesting level.

SPECULATE starts a transaction by taking a register checkpoint of rIP and rSP with the shadow register file and increasing the transaction depth counter. A nested SPECULATE does not take a register checkpoint since aborted transactions always restart from the outermost SPECULATE for flat nesting. Detecting a LOCK MOV, the instruction decoder 300 sends a signal to the LS unit 314 when the instruction is dispatched. Receiving the signal, the LS unit 314 sets the TW bit 310 in an entry 315 in the store queue 314 for a store operation and the TR bit 312 in the load queue entry 316 for a load operation. The TR bit 312 in the load queue entry 316 is cleared when the LOCK MOV retires, and the corresponding TR bit 312 in the L1 cache 313 is set by that time. The TW bit 310 in the store queue entry 315 is cleared when the transactional data is transferred from the LS unit 314 to the cache 313 along with setting the TW bit 310 in the cache 313. If transactional data is written to a line in the cache 313 that contains non-transactional dirty data (i.e., a D (Dirty) bit 320 is set, but the TW bit 310 is not set), the cache line is flushed to make sure that the last committed data is preserved in the L2/L3 caches or main memory. RELEASE clears the TR bit 312 of the cache line that matches the release address. It triggers a #GP exception if the TW bit 310 of the matching cache line is set or there is a matching entry in the LS unit 314.

A transaction conflict may be detected by the conflict detector 304 by comparing the incoming cache coherence messages against the TW/TR bits 310, 312 in the cache 313 and the portion of the LS unit 314 that contains the store operations of retired instructions. There are two cases for transaction conflict. The first case occurs when the message is for data invalidation and the TW bit 310 or TR bit 312 is set. The second case occurs when the message is for data sharing and the TW bit 310 is set. An attacker-win contention management scheme is used for conflict resolution, in which the core receiving the conflicting message triggers a transaction abort in the TM abort handler 302. No change in the cHT network fabric is required since nothing about the conflict needs to be reported to the core that has sent the message. The micro-coded TM abort handler 302 is invoked when a conflict is detected. The handler 302 invalidates the lines in the cache 313 with the affected TW bits, clears all TW/TR bits, restores the register checkpoint, and flushes the pipeline. The execution flow starts from the instruction right below the outermost SPECULATE with the ZF (Zero Flag) set. The micro-coded TM abort handler 302 is also triggered by ABORT, prohibited instructions, transaction overflow, interrupts, and exceptions. If the transaction reaches COMMIT, it is committed by clearing all TW/TR bits 310, 312, discarding the register checkpoint in the shadow register file, and decreasing the transaction depth counter 306.

A transaction is aborted when the TW/TR bits 310, 312 overflow the cache 313. Such a transaction overflow is detected when the transfer of the TW/TR bits 310, 312 from the LS unit 314 to the L1 cache 313 meets two conditions: 1) it causes a cache miss (i.e., no cache line to retain the bits) and 2) all cache lines of the indexed cache set have their TW and/or TR bits 310, 312 set (i.e., no cache line to evict without triggering an overflow). An additional small OR/AND-gate network of the TW/TR bits 310, 312 per cache set is used to check the second condition. If a non-transactional access meets the two conditions, the L1 cache 313 handles it as if it is a UC (uncacheable) type to avoid a transaction overflow. This enables the minimum guarantee equal to the set associativity of the L1 cache 313. To hold as much transactional data as possible, the cache eviction policy gives a higher priority to the cache lines with the TW/TR bits 310, 312 set. To further avoid transaction overflows, the TW/TR bits 310, 312 are kept in the LS unit 314 when the two conditions above are met. A transaction overflow is triggered when the LS unit 314 does not have an available entry for an incoming memory access (i.e., the TW/TR bits 310, 312 of all entries 315, 316 are set in the LS unit 314 to which the access goes). At least one LS unit entry 315, 316 is needed for non-transactional accesses to make forward progress when the TW/TR bits 310, 312 of the other entries are set.

The HTM microprocessor 100 uses the set of five instructions identified in Table 1 for denoting the beginning and ending of a critical section and for protecting memory objects. Additionally, critical sections first need to specify which memory objects should be protected using special declarator instructions.

Once a set of memory objects is protected, a critical section can modify these memory objects speculatively. If a critical section completes successfully, all such modifications become visible to all CPUs simultaneously and atomically. Otherwise, the modifications are discarded.

A critical section has the following structure:
1. The critical section is entered with a SPECULATE instruction.
2. SPECULATE writes a status code of zero in rAX and sets rFLAGS register accordingly. This status code distinguishes between the initial entry into a critical section and an abort situation. SPECULATE also remembers the address of the instruction following the SPECULATE instruction as the landmark to which control is transferred on an abort.
3. SPECULATE is followed by instructions that check the status code and jump to an error handler if it is not zero (typically JNZ).
4. The critical section (standard x86 instructions) is executed.
5. A protected memory location can be read or modified using LOCK MOVx instructions. (It is an error to use regular memory updating instructions for protected memory locations. Doing so results in a #GP exception.)
6. The COMMIT instruction denotes the end of the critical section and causes the modifications to the protected lines to become visible to the rest of the system.
7. An ABORT instruction is available to programmatically terminate the critical section with abort rather than commit semantics.

In the illustrated embodiment, the HTM microprocessor 100 protects memory lines that have been specified using declarator instructions, such as LOCK MOVx(load), LOCK PREFETCH, AND LOCK PREFETCHW. In the illustrated embodiment, all other memory remains unprotected and can be modified inside a critical section using standard x86 instructions. These modifications become visible to other CPUs immediately, in program order.

In one embodiment, declarators are memory-reference instructions that are used to specify locations for which atomic access is desired. Declarators work like their counterparts without the LOCK prefix, with the following additional operation: each declarator adds the memory line containing the first byte of the referenced memory object to the set of protected lines. Software checks to determine if unaligned memory accesses span both protected and unprotected lines; otherwise, the atomicity of data accesses to these memory objects is not guaranteed.

Unlike prefetches without a LOCK prefix, LOCK PREFETCH and LOCK PREFETCHW also check the specified memory address for translation faults and memory-access permission (read or write, respectively) and, if unsuccessful, generate a page-fault or general-protection exception as appropriate. Also, LOCK PREFETCH and LOCK PREFETCHW generate a #DB exception when they reference a memory address for which a data breakpoint has been configured.

A declarator referencing a line that has already been protected is permitted and behaves like a regular memory reference. It does not change the protected status of the line. Once a memory line has been protected using a declarator, it can be modified speculatively (but cannot be modified nonspeculatively) within the critical section.

TABLE 2

```
Dcas:
   MOV RCX, 0
   SPECULATE
   JNZ <Failed>
```

TABLE 2-continued

```
   LOCK MOV RAX, [mem1]
   LOCK MOV RBX, [mem2]
   CMP R8, RAX
   JNE <Finish>
   CMP R9, RBX
   JNE <Finish>
   LOCK MOV [mem1], RDI
   LOCK MOV [mem2], RSI
   MOV RCX, 1
Finish:
   COMMIT
   JMP <Out>
Failed:
   MOV RCX, 0
Out:
```

Table 2 shows an example of a software routine for double-word compare-and-swap (DCAS) that may be decoded and executed by the HTM microprocessor 100. DCAS is a useful primitive that allows atomic manipulation of two arbitrary operands in memory. As shown in Table 2, after starting a transaction with SPECULATE, the software checks if the two word-size memory locations, mem1 and mem2, have the same values as the given values in R8 and R9. If they do, the locations are updated with new values RDI and RSI. If they do not, the routine jumps to Finish without updating the locations. LOCK MOV is used for checking and updating memory locations so that: 1) a transaction conflict is detected when another transaction accesses mem1 and mem2; and 2) the updates to mem1 and mem2 are committed only when the transaction finishes without a conflict. RCX has the result code: 1 for a successful swap and 0 for a failure. On detecting a conflict, the software routine escapes by aborting the transaction and jumping to Failed where RCX is set to 0.

While the HTM instructions can be very useful in providing flexible multi-word atomic primitives, one of the critical problems with first-generation HTM support is the lack of compiler support for these HTM instructions. As shown in the example above, the use of the HTM instructions is quite complex and demands assembly coding and thorough knowledge of each instruction by the programmer. These factors reduce at least one significant benefit of HTM—easy parallel programming for routine programmers. In spite of the apparent need for HTM compiler support, no commercial compiler currently has HTM support, as the hardware support for HTM has barely started to be developed for commercial processors, there is no industry standard ISA for the HTM support that compiler developers can use to develop a common HTM support for different HTM systems, and it is a complex task to add compiler support for complex hardware features such as HTM systems.

While there are no commercial compilers with HTM support currently available, there are several commercial compilers that support STM systems, such as Intel c++ stm compiler at http://software.intel.com/enus/articles/intel-c-stm-compiler-prototype-edition-20/ and GCC for Transactional Memory at http://www.hipeac.net/node/2419. STM systems support transactional execution by providing STM functions for data versioning and conflict detection. The compilers enable programmers to use high-level language constructs such as atomic blocks (e.g., _tm_atomic { } in the Intel STM compiler and runtime ABI) to enclose a code segment to be executed transactionally.

TABLE 3

```
Add_to_hashtable(element)
{
    ...
    _tm_atomic
    {
        ...
        // calculate the idx from
        // the hash value of the element
        buckets[idx] = element
        .
    }
    ...
}
```

For example, Table 3 shows a pseudo code segment that attaches a new element to a bucket of a hash table in an atomic block. The STM compilers analyze the atomic block and instrument STM functions from STM runtime systems for transactional execution.

TABLE 4

| Atomic Block | STM Functions |
|---|---|
| _tm_atomic { | beginTransaction( ) |
| Load instruction in the block | readBarrier( ) |
| Store instruction in the block | writeBarrier( ) |
| } | endTransaction( ) |

Table 4 shows the mapping between the atomic block and the STM functions. The open bracket of the atomic block is mapped to the STM function to start a transaction (i.e., beginTransaction), and the closing bracket of the block is mapped to the STM function to commit the transaction (i.e., endTransaction). The memory accesses in the block are instrumented with the function calls to the STM memory barrier functions (i.e., readBarrier and writeBarrier) that track transactional accesses to detect transaction conflicts and manage transactional data in case the transaction has to be rolled back.

TABLE 5

```
...
CALL <beginTransaction>
...
// pass the address of buckets[idx]
// through %eax
LEA (%edx, %edi,4), %eax
CALL <readBarrier>
...
CALL <endTransaction>
...
```

The resulting code instrumented with the calls to the STM functions are shown in Table 5. The STM functions are part of STM runtime libraries and are linked to the instrumented code at the time that the program is compiled. The STM runtime system provides the instrumented code with transactional execution through the STM functions.

In one embodiment of the instant invention, compiler support for HTM systems is provided by leveraging the existing compiler support for S™ systems. Once programmers demarcate transactions with atomic blocks, the compilers with STM support generate the assembly code annotated with the STM functions for transaction boundary demarcation and memory barriers as explained above. Then, in accordance with one aspect of the instant invention, a thin software shim layer is used to map the STM functions to the HTM ISA.

TABLE 6

| STM Functions | ASF ISA |
|---|---|
| beginTransaction( ) | SPECULATE |
| readBarrier( ) | LOCK MOV |
| writeBarrier( ) | LOCK MOV |
| endTransaction( ) | COMMIT |

For example, Table 6 shows the mapping between the STM functions and the HTM functions. Generally, the shim layer is a very thin STM runtime system in which the STM functions for transaction boundary demarcation and memory barriers are implemented using the HTM. The functions to begin and end a transaction are implemented with a single SPECULATE and a single COMMIT, respectively. The memory barrier functions are implemented with a single LOCK MOV. The compiled code uses the HTM support in AMD processors by invoking the STM functions implemented directly with the HTM instructions. In addition to the instructions from the ASF ISA, additional code may be required to properly align the interfaces of the HTM and the STM and to provide additional functionality. In particular, the SPECULATE instruction does not create a full register snapshot, but captures only the rIP and rSP registers (instruction and stack pointer). The STM beginTransaction( ) function, however, is usually expected to create such a snapshot. Hence to make functionality compatible, additional code in the shim layer is needed to create a similar register snapshot, for example, by copying all live register values to a location on the stack or the transaction descriptor (similar to or even with the setjmp function).

The STM compiler eliminates unnecessary software barriers to lower the memory barrier overhead. For example, as a CISC (complex instruction set computer) architecture, AMD64 has a small number of architectural registers and induces stack accesses to spill the registers. These stack accesses do not require conflict detection since they are to private data if the data does not escape the stack. If the stack variables are created after a transaction begins, the accesses to the variables do not need data versioning as well since the variables are effectively discarded by restoring the stack pointer when the transaction is aborted. As a result, these stack accesses do not require software barriers. The same compiler techniques apply to one embodiment of the instant invention since only those necessary memory accesses protected with memory barriers will be executed with LOCK MOVs, which reduce HTM resource consumption in comparison with the case where all memory accesses of a transaction are processed transactionally.

One embodiment of the instant invention allows processor vendors to quickly provide compiler support for an HTM instruction sets, such as ASF: 1) without waiting for compiler developers to implement a specialized support specific to the ISA extension or 2) investing a long time and a large amount of human resources to develop it by processor vendors themselves. To illustrate the utility of the instant invention, one embodiment of the instant invention was implemented for the AMD ASF by leveraging the STM support in TM GCC. TM GCC has an embedded STM runtime system compliant with Intel transactional memory compiler and runtime ABI. The STM runtime system was replaced by the above-described shim layer that implements the ABI directly with the ASF ISA. To evaluate the shim layer, a multithreaded micro-benchmark in which a random integer number is inserted into a shared 229-bucket hashtable in an atomic block (i.e., _tm_atomic) and each thread repeats the insertion 10,000 times. The micro-benchmark was compiled with TM GCC, linked with the shim layer, and executed on a cycle-accurate ASF simulator with the architectural parameters shown in Table 7.

The compiler may introduce optimized versions of the memory barriers to allow optimizations for STMs with different versioning and conflict detection mechanisms. For example, some STMs may not need to check and/or modify their meta-data for repeated operations, such as an STM load from a location that has already been accessed through an STM load. In these cases, the compiler may generate specialized barriers, such as STM_load_after_load for the second STM access. Other similar optimizations apply for other combinations of read/write after read/write to same location.

With such an optimizing STM compiler, ASF can be used through a shim layer, too, by either implementing the specialized barriers just like the non-specialized ones (e.g., STM_load_after_load->STM_load->LOCK MOV), or by dropping the LOCK prefix, where allowed by the ASF spec (STM_load_after_load->MOV).

Other optimizing compilers may not generate generic barriers that allow optimization after compile time, but rather optimize code for specific STM characteristics, such as eager or lazy data versioning. In these cases, care has to be taken to compile properly for the shim layer to work as expected. In the example, compilation for lazy versioning STMs causes proper usage of the shim layer.

TABLE 7

```
_tm_atomic
{
    X = 1 // a barrier is instrumented for both eager and lazy data versioning
    X = 2 // a barrier is instrumented for lazy data versioning but not for
eager data versioning
}
```

Table 7 shows how the compiler optimizes memory differently with a simple atomic block that has two store accesses to the same variable. When optimized for lazy data versioning, the second store is annotated with a barrier since the new store data has to be buffered. On the other hand, when optimized for the eager data versioning, it is not annotated with a barrier since the last committed data is logged when the first store is executed with a barrier. This second store without a barrier is troublesome to an HTM implementation since it is executed as a non-transactional access and overwrites the transactional data of the first store. This makes it complex for the underlying HTM implementation to maintain the coherence of the variable since a transaction conflict against the variable has to be detected due to the first store while the non-transactional value of the variable from the second store has to stay permanent even when the current transaction is aborted. To avoid this complexity, one embodiment of the instant invention uses the transactional code compiled for lazy data versioning where store operations are always annotated with barriers.

One embodiment of the instant invention allows processor vendors to quickly provide compiler support for an HTM instruction sets, such as ASF: 1) without waiting for compiler developers to implement a specialized support specific to the ISA extension or 2) investing a long time and a large amount of human resources to develop it by processor vendors themselves. To illustrate the utility of the instant invention, one embodiment of the instant invention was implemented for the AMD ASF by leveraging the STM support in TM GCC. TM GCC has an embedded STM runtime system compliant with Intel transactional memory compiler and runtime ABI. The STM runtime system was replaced by the above-described shim layer that implements the ABI directly with the ASF ISA. To evaluate the shim layer, a multithreaded micro-benchmark in which a random integer number is inserted into a shared 229-bucket hashtable in an atomic block (i.e., _tm_atomic) and each thread repeats the insertion 10,000 times. The micro-benchmark was compiled with TM GCC, linked with the shim layer, and executed on a cycle-accurate ASF simulator with the architectural parameters shown in Table 8.

TABLE 8

| Feature | Description |
| --- | --- |
| CPU | 2 GHz, single-issue, in-order, 8 × 86 cores |
| L1 Cache | 32 KB, 4-way, 32B line, MOESI, write-back, 3 cycle hit time, private |
| L2 Cache | 1 MB, 8-way, 32B line, MOESI, write back, 15 cycle latency, private |
| Memory | 4 GB, 150-cycle latency |
| Interconnect | AMD Coherent HyperTransport |

Figure 4:
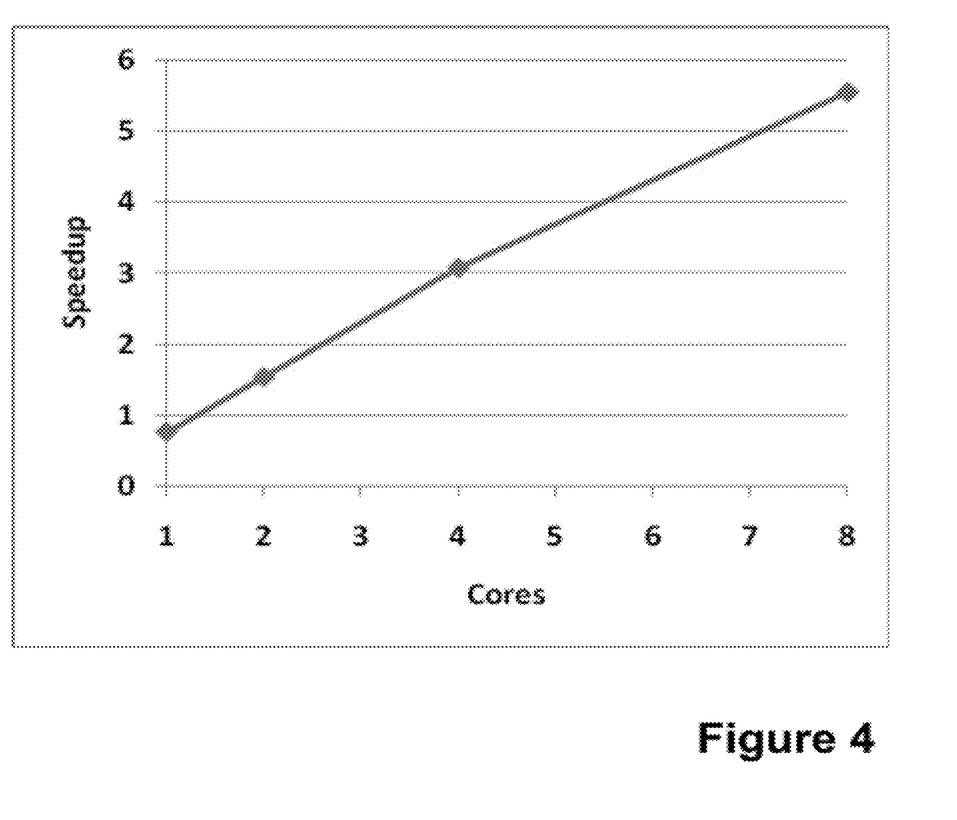
FIG. 4 is a graph illustrating performance of one embodiment of the instant invention.

FIG. 4 shows the speedup of the two versions with up to eight cores. The execution time is normalized to the sequential execution time of the micro-benchmark without transactions. The TM GCC version scales well from 0.76 with a single core to 5.55 with eight cores.

The operation of the compiler described herein may be appreciated by reference to an exemplary program that may be compiled using the process described herein. The exemplary program is part of a multi-threaded worker function that sets a series of bits in a data array (i.e., "data_array") to a value of "1" with a transaction in a for loop. Atomic{ } is used to demarcate a transaction boundary. The code is written in C and compiled by an HTM compiler of the type described herein. The source code to be compiled is set forth in Table 9.

TABLE 9

```
static void work (void* argPtr) {
    int myId = 1;
    int iter,num,idx;
    for(iter = 0; iter < iteration; iter++) {
        atomic {
            idx = 0;
            for(num = 0; num < numAccess; num++) {
                // here's the only shared memory access (i.e., to
                // "data_array") in this function.
                data_array[myId * 8 + idx/4] = 1;
                idx = idx + stride;
            }
        }
    }
}
```

The resulting compiled code is set forth in Table 10 below, with the compiled code shown on the left, and commentary identifying various sections of the compiled code on the right.

TABLE 10

| | |
| --- | --- |
| work:<br>push %ebp<br>mov %esp,%ebp<br>push %edi<br>push %esi<br>push %ebx | Function Stack Setup |
| sub $0xc,%esp<br>... | The Outer Loop Management Code |
| tx_begin:<br>speculate | Transaction Begin |
| Jnz <tx_begin><br>... | The Inner Loop Management Code |
| mov −0x14(%ebp),%edi<br>lea 0x3(%edx),%eax<br>cmovg %edx,%eax<br>sar $0x2,%eax<br>add %edi,%eax<br>mov 0x0(%ebx),%edi | "data array" index calculation |
| lock mov %esi,(%edi,%eax,4) | Transactional Store |
| ... | The Rest of the Inner Loop Body |

TABLE 10-continued

| | |
|---|---|
| commit | } Transaction End |
| ... | } The Inner Loop Exit Check Code |
| ... | } The Outer Loop Exit Check Code |
| add $0xc,%esp | |
| pop %ebx | |
| pop %esi | } Function Stack |
| pop %edi | |
| pop %ebp | |
| ret | } Function Return |

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. An apparatus for compiling software written to be executed on a microprocessor that supports at least one hardware transactional memory function, comprising:
   a processor configured to implement:
      a compiler, providing native software transactional memory (STM) support, to identify demarcations of atomic blocks of the software and to generate, based on the atomic blocks, assembly code annotated with STM functions; and
      a shim layer to implement the STM functions using corresponding hardware transactional memory instructions and any necessary additional code to make the HTM instructions compatible with the STM functions,
   wherein the STM functions include transaction boundary demarcation and memory barriers.

2. An apparatus, as set forth in claim 1, wherein the STM functions include a function that begins a transaction and the shim layer maps the function that begins the transaction to at least a speculate instruction.

3. An apparatus, as set forth in claim 1, wherein the STM functions include a function that ends a transaction and the shim layer maps the function that ends the transaction to a commit instruction.

4. An apparatus, as set forth in claim 1, wherein memory barriers include a read barrier.

5. An apparatus, as set forth in claim 4, wherein the shim layer is to map the read barrier to at least a LOCK MOV instruction.

6. An apparatus, as set forth in claim 1, wherein the memory barriers include a write barrier.

7. An apparatus, as set forth in claim 6, wherein the shim layer is to map the write barrier to at least a LOCK MOV instruction.

8. An apparatus, as set forth in claim 1, wherein the STM functions include a function that begins a transaction and the shim layer maps the function that begins the transaction to a speculate instruction.

9. An apparatus, as set forth in claim 1, wherein the processor is further configured to implement the shim layer as a runtime system.

10. A method for providing compiler support for at least one hardware transactional memory function, comprising:
    providing a compiler, having native software transactional memory (STM) support, to identify demarcations of atomic blocks of a portion of software and generate, based on the atomic blocks, assembly code annotated with at least one STM function; and
    providing a shim layer that implements the at least one STM function of the compiler using at least one HTM instruction and any additional code to needed to make the HTM instructions compatible with the STM functions,
    wherein the at least one software transactional memory function is selected from a group including transactional boundary demarcation and memory barriers.

11. A method, as set forth in claim 10, wherein the at least one software transactional memory function includes a function that begins a transaction and the shim layer maps the function that begins the transaction to at least a speculate instruction.

12. A method, as set forth in claim 10, wherein the at least one software transactional memory function includes a function that ends a transaction and the shim layer maps the function that ends the transaction to a commit instruction.

13. A method, as set forth in claim 10, wherein the at least one software transactional memory function includes a includes a read barrier.

14. A method, as set forth in claim 13, wherein the shim layer maps the read barrier to a LOCK MOV instruction.

15. A method, as set forth in claim 10, wherein the at least one software transactional memory function includes a write barrier.

16. A method, as set forth in claim 15, wherein the shim layer maps the write barrier to a LOCK MOV instruction.

17. A method, as set forth in claim 10, wherein the shim layer is a runtime system.

18. A non-transitory computer readable program storage device encoded with at least one instruction that, when executed by a computer, performs a method comprising:
    identifying, by a compiler having native software transactional memory (STM) support, demarcations of atomic blocks of a portion of software; and
    generating, by the compiler, assembly code based on the atomic blocks, the assembly code annotated with STM functions; and
    providing a shim layer that implements the STM functions using corresponding hardware transactional memory (HTM) instructions and any additional code to needed to make the HTM instructions compatible with the STM functions,
    wherein the STM functions include boundary demarcation and memory barriers.

19. A non-transitory computer readable program storage device, as set forth in claim 18, wherein the STM functions include a function that begins a transaction and mapping comprises mapping the function that begins the transaction to a speculate instruction.

20. A non-transitory computer readable program storage device, as set forth in claim 18, wherein the STM functions include a function that ends a transaction and mapping comprises mapping the function that ends the transaction to a commit instruction.

21. A non-transitory computer readable program storage device, as set forth in claim 18, wherein the STM functions include a read barrier.

22. A non-transitory computer readable program storage device, as set forth in claim 18, wherein mapping comprises mapping read barrier mapped to a LOCK MOV instruction.

23. A non-transitory computer readable program storage device, as set forth in claim 18, wherein the STM functions include a write barrier.

* * * * *